United States Patent [19]
Fitting

[11] Patent Number: 5,857,192
[45] Date of Patent: Jan. 5, 1999

[54] QUALITY CONTROL SYSTEM EMPLOYING BI-DIRECTIONAL MESSAGING USING EMPTY FILES

[75] Inventor: Samuel Stephen Fitting, Grayslake, Ill.

[73] Assignee: Motorola, Inc., Schaumburg, Ill.

[21] Appl. No.: 717,561

[22] Filed: Sep. 23, 1996

[51] Int. Cl.$^6$ .................................................. G06F 17/30
[52] U.S. Cl. ............................... 707/10; 707/3; 707/200; 395/200.09; 364/468.17
[58] Field of Search .................................. 707/1, 206, 3, 707/204, 2, 6, 9, 8, 10, 200, 205; 364/490, 468, 497, 468.15, 468.16, 468.17; 395/200.03, 200.08, 200.09, 727, 500

[56] References Cited

U.S. PATENT DOCUMENTS

| | | | |
|---|---|---|---|
| 5,317,728 | 5/1994 | Tevis | 707/204 |
| 5,355,320 | 10/1994 | Erjavic | 364/488 |
| 5,392,209 | 2/1995 | Eason | 707/3 |
| 5,434,790 | 7/1995 | Saka | 364/468.17 |
| 5,434,792 | 7/1995 | Saka | 364/468.17 |
| 5,463,555 | 10/1995 | Ward | 364/468.02 |
| 5,539,652 | 7/1996 | Tegethoff | 364/490 |
| 5,555,351 | 9/1996 | Craig | 395/114.101 |
| 5,664,100 | 9/1997 | Miura | 395/200.62 |
| 5,668,735 | 9/1997 | Dominguez | 364/497 |

OTHER PUBLICATIONS

SRM/UX, System Administrator's and User's Guide, Copyright © Hewlett–Packard Company 1991, Reprint Apr. 1993, Chapter 2, SRM/UX Orientation and System Planning Guide, pp. 2–1 to 2–27.

SQL*Net®TCP/IP User's Guide, Version 1.2, Part No. 615–V1.2, ©Copyright 1989 Oracle Corporation, Belmont, California, Chapter 1, pp. 1–1 to 1.7.

*Primary Examiner*—Wayne Amsbury
*Assistant Examiner*—Srirama Channavajjala
*Attorney, Agent, or Firm*—Mark D. Patrick

[57] ABSTRACT

A quality control system (104) comprises at least one test system (107) and a host computer (122) having a database (130), coupled via a communication link (124). The test system (107) interfaces (120) with a product (118) and obtains its product identifier. The test system (107) outputs, to the host computer (122), an empty file named for the product identifier and a label indicating the type of data to request. The host computer (122), responsive to reading the file name of the empty file, queries the database (130) according to the product identifier and the label. The host computer (122) renames the empty file according to the requested data retrieved via the query. The test system (107), responsive to reading the renamed empty file, tests the product (118) according to the requested data.

17 Claims, 3 Drawing Sheets

QUALITY CONTROL SYSTEM EMPLOYING BI-DIRECTIONAL MESSAGING USING EMPTY FILES

FIELD OF THE INVENTION

The present invention relates to quality control systems that employ messaging.

BACKGROUND OF THE INVENTION

To remain competitive, a manufacturer must employ a quality control system capable of gathering information about each of the products it manufactures. One such quality control system includes one or more test systems coupled via a communication link to a host computer having a database. A shared file directory is employed by the host computer to negotiate communications between the test systems, the communication link, and the database. Each test system interfaces with a product and subjects the product to tests. Once the tests are concluded, the test system outputs a file containing test result data to the shared file directory. The host computer opens the file in the shared file directory, reads the test result data from the opened file, and inserts the test result data into the database. Aside from test result data provided by the test systems, the database also contains a plurality of other information about each product from other systems located in the manufacturing environment and visited by each of the products prior to delivery to the test systems. Such information includes model number data, test status data, repair data, defect data, or the like.

Unfortunately, the test systems only communicate unidirectionally—from the test system to the database—and can not retrieve previously stored product information. As a result, each of the products must employ a product identifier contained in, for example, a bar-code attached to the product. The product identifier includes a unique designator to differentiate one product from another and a model designator to designate the model of the product. An example of such a product identifier is "2TWP008", wherein "2TWP0" is the unique identifier and "08" designates the model. The test system obtains the product identifier during interfacing, extracts the model designator from the product identifier, and configures itself according to the model designator so as to test the product as that particular model. However, the use of product identifiers having model designators increases manufacturing costs because, for example, a separate set or roll of preprinted bar-codes must be specifically purchased for each model and is limited for use with only that model. The use of product identifiers having model designators also adds unwanted additional complexity to the manufacturing system. The data "stored" on each product (i.e., the model designator in the product identifier) duplicates that which must be maintained in the database.

Therefore, what is needed is an apparatus and method that permits bi-directional messaging between a test system and a database so as to allow the test system to retrieve product information, such as a model number, from the database in substantially real-time and, thereby, eliminating the need for information redundancy in the manufacturing system.

DETAILED DESCRIPTION OF THE PREFERRED EMBODIMENTS

Figure 1:
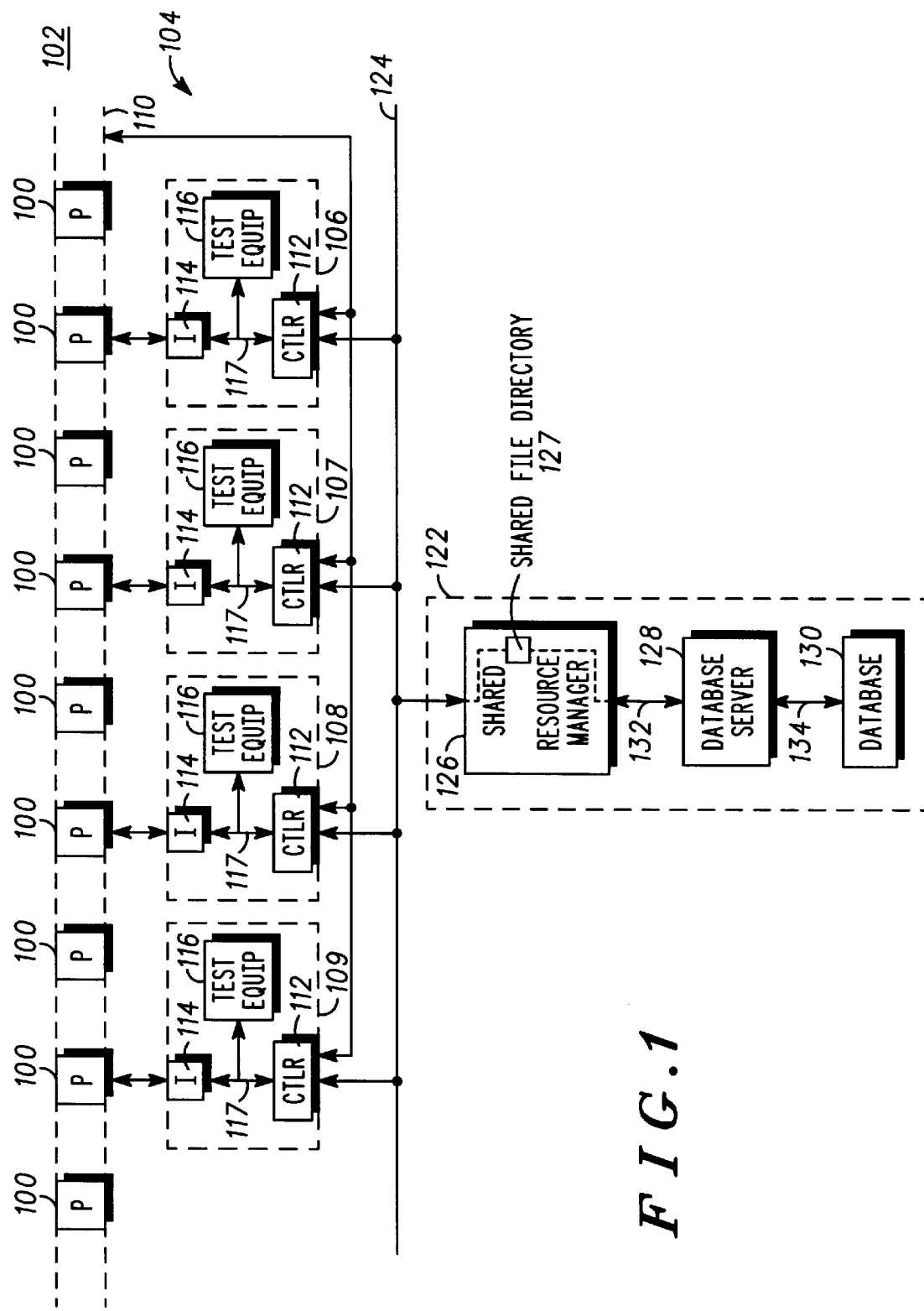
FIG. 1 is a block diagram functionally illustrating a manufacturing system including a quality control system employing bi-directional messaging.

A quality control system of a manufacturing system comprises at least one test system and a host computer having a database. The test system and host computer are coupled via a communication link. The test system interfaces with a product being manufactured and obtains its product identifier. The test system outputs, to the host computer, an empty file name including the product identifier and a label indicating the type of data requested. The host computer, responsive to reading the file name of the empty file, queries the database according to the product identifier and the label. The host computer overwrites the empty file changing the file name to include the product identifier and requested data retrieved via the query. The test system, responsive to reading the file name of the overwritten empty file from the host computer via the communication link, tests the product according to the requested data. By communicating information in the name of a file, substantially real-time bi-directional messaging can be accomplished between a test system and a host computer.

Products 100 (FIG. 1) in a section of a manufacturing system 102 are evaluated by a quality control system 104. The quality control system 104 comprises test systems 106, 107, 108, and 109 and a host computer 122. The products 100 travel in the section of the manufacturing system 102 via a portion of a conveyance 110, which delivers the products 100 to test systems 106–109. The conveyance 110 can be a computer controlled conveyance The products can be delivered to the test system, and separated therefrom, by a robot arm, for example.

The products 100 are, for example, circuit boards having circuitry assembled thereto. Each one of the products 100 is any one of a plurality of different models and comprises a product identifier. The product identifier is unique so as to permit differentiation of the products 100 from one another. The product identifier is preferably in the form of a bar-code placed on the product, but may alternatively be an electronic serial number (ESN) internally stored within the product. If the product identifier is stored internally, an electrical connection must be made to the product to read the ESN, whereas a bar code can be read before such connection is made.

Each of the test systems 106–109 includes a controller 112, an interface 114, and test equipment 116 interconnected via a bus 117. Each controller 112 of each of the test systems 106–109 is interconnected with one another and coupled to the conveyance 110 via a bus 111 to coordinate sequential delivery of the products 100 to the test systems 106–109. The controller 112 controls the interface 114 and test equipment 116 via bus 117 to test each one of the products 100. The interface 114 comprises known equipment, such as a bar-code scanner to visually read the product identifier and an electromechanical connector for electrically connecting to the products 100. Once read, the interface 114 couples the product identifier to the controller 112 via bus 117. In the illustrated embodiment, the controller 112 is a model number HP9000/382 controller computer having a version 6.2 RMB (Rocky Mountain BASIC (Beginner's All Purpose Symbolic Instruction Code)) operating system and being commercially available from Hewlett Packard. The controller 112 includes an accessible storage medium, such as that implemented in a random-access memory (RAM), a floppy or magnetic disk, a read/write compact disk (CD) read-only memory (ROM), or the like, for storing RMB instructions embodying the process of FIG. 2.

The controller 112 communicates with the host computer 122 by outputting a file containing data on the communication link 124 or retrieving a file containing data via the communication link 124. In the illustrated embodiment, the communication link 124 communicates messages and is embodied by 10BaseT or coaxial cabling connections employing Ethernet.

The host computer 122 comprises a shared resource manager (SRM) 126, a database server 128, and a database 130. The SRM 126 is coupled to the communication link 124 and the database server 128 via connection 132. The SRM 126 includes a shared file directory 127 that holds files communicated by the controller 112 via the communication link 124 and the database server 128 via connection 132. The controller 112 can retrieve files from the shared file directory 127 that were placed there by the database server 128. The database server 128 can retrieve files from the shared file directory 127 that were placed there by the controller 112. The database server 128 is further coupled to the database 130 via connection 134. The database server 128 can insert data into, and retrieve data from, the database 130 via connection 134. The database 130 is populated with model number data, test status data, repair data, defect data, date data, or the like, that corresponds to each of the products 100. This data was gathered by other portions of the manufacturing system (not shown) and previously inserted into the database 130 prior to the delivery of products 100 to the test systems 106–109. In the illustrated embodiment, the host computer 122 is a RS 6000/R30 computer commercially available from Motorola and having a version 4.1.3 AIX Unix-based operating system; the SRM 126 is version 9.2 HP/UX (Hewlett Packard/Unix) Shared Resource Manager software commercially available from Hewlett Packard; and the database 130 is a version 7.1.6 Oracle RDBMS (Relational Database Management System) commercially available from Oracle.

In the past, data communication between a similar database and test system was limited to one direction—from the test system to the database. The test system outputted a file containing data to the shared file directory of the host computer. The database server of the host computer, via a loading routine, accessed the file in the shared file directory, opened the file, read the data from the file, and inserted the data into the database. Such file handling operations, caused heavy processor loading on the host computer, particularly when multiple files from multiple test systems were involved. As a result, the loading routine could only be executed approximately once every minute. It was recognized that using similar methods to permit retrieval by the test system of data from the database would not be feasible because, aside from additionally loading the host computer, each test system would have to delay testing each product for at least a minute until the requested data could be received. In a high volume manufacturing environment, such as manufacturing system 102, such delays would be unacceptable.

Figure 2:
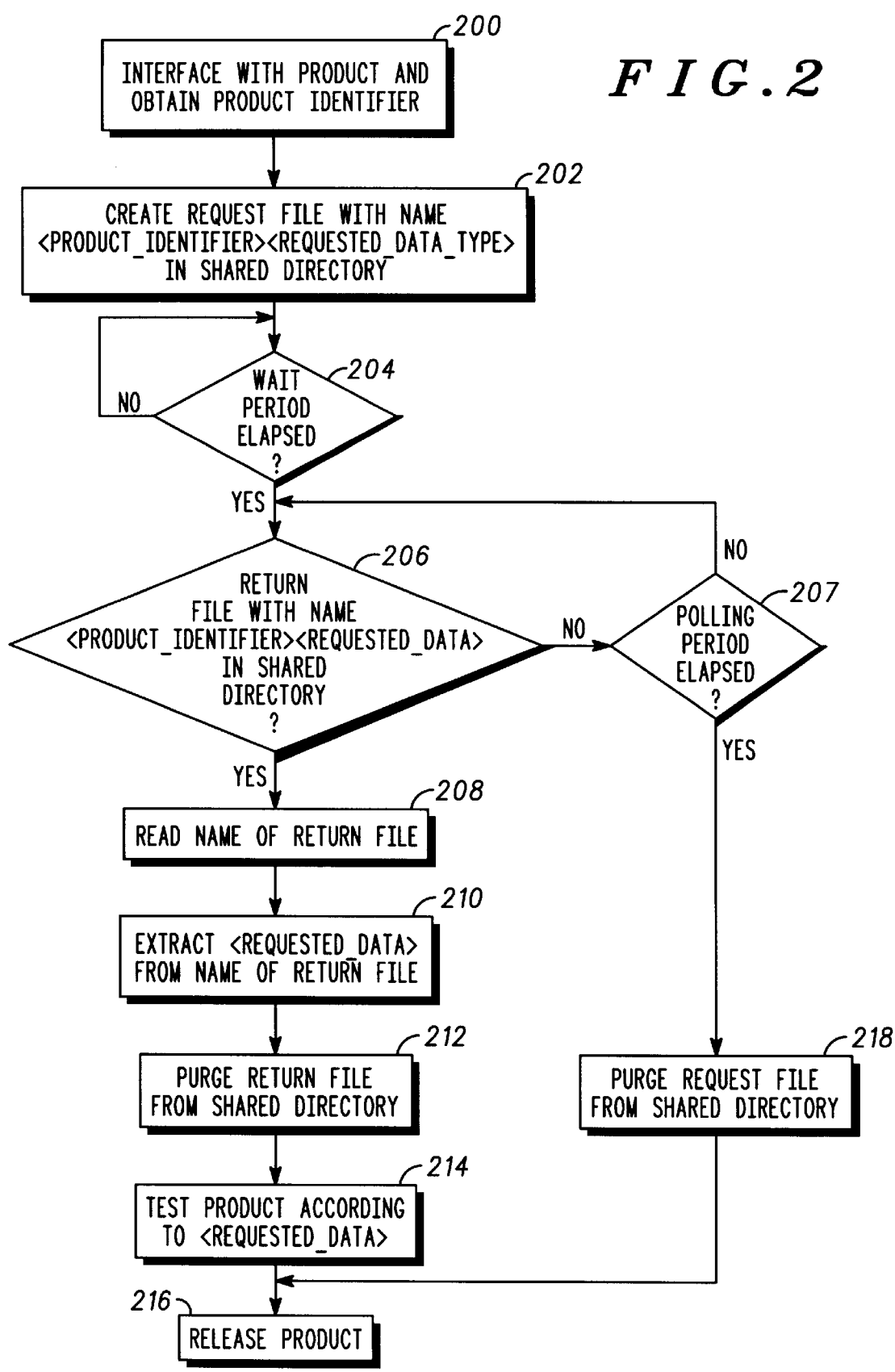
FIG. 2 is a flowchart illustrating the operation of a test system of the quality control system of FIG. 1.
Figure 3:
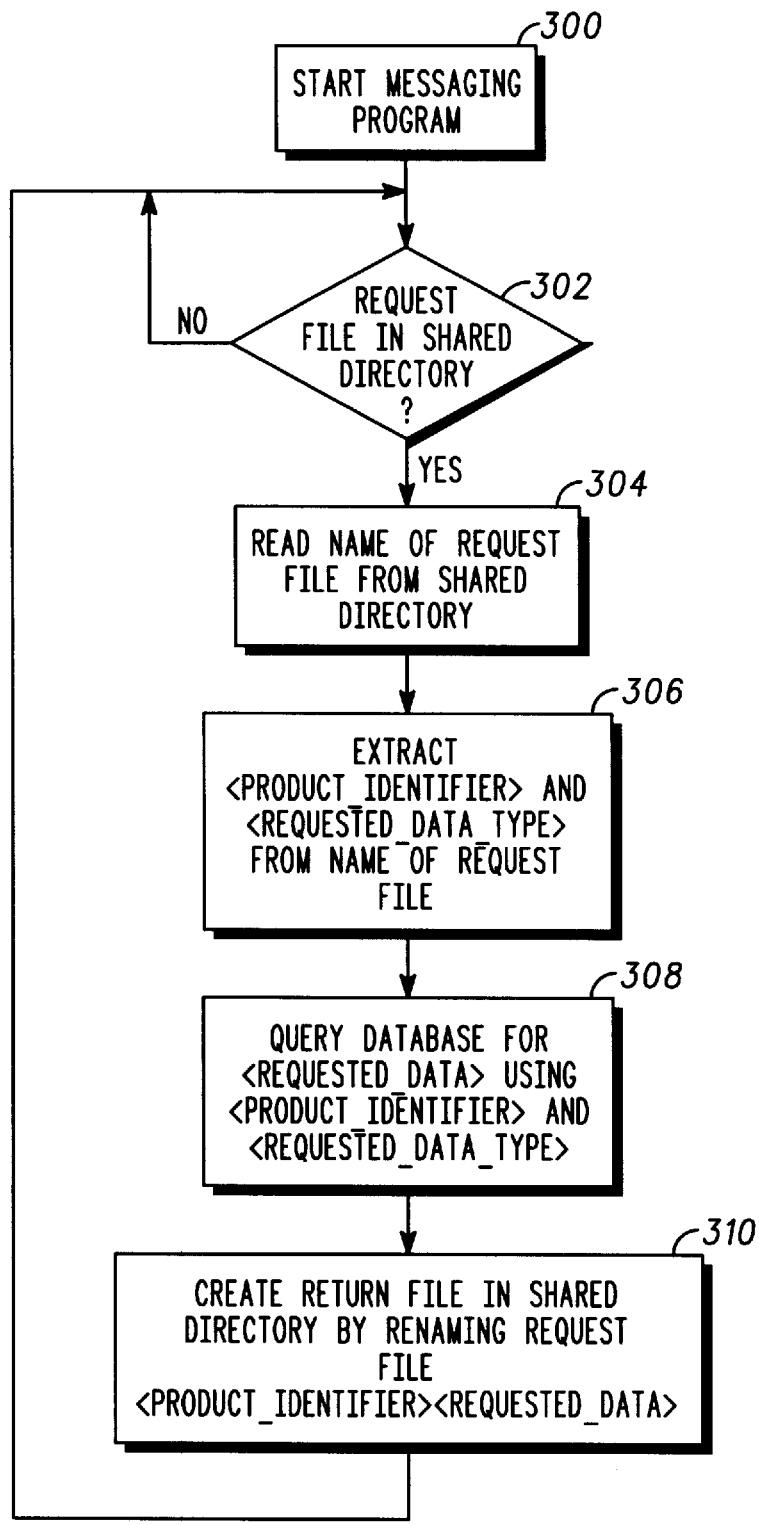
FIG. 3 is a flowchart illustrating the operation of a host computer of the quality control system of FIG. 1.

The quality control system 104 achieves bi-directional data transfer or messaging between the test systems 106–109 and the database 130, without additional loading and lengthy delays, by employing the processes shown in FIGS. 2 and 3. Bi-directional messaging is illustrated in FIG. 1 by the double-headed arrows representing the communication link 124 and the connections 132 and 134. For each one of the products 100 delivered, the controller 112 of test systems 106–109 executes the process of FIG. 2 to retrieve information, such as model number data, from the database 130 and, thereby, eliminate the need for products 100 to "store" redundant information, such as product identifiers containing model designators. For illustrative purposes, the processes of FIGS. 2 and 3 will be described hereinbelow with reference to product 118 (FIG. 1), which is representative of any of the products 100, and test system 107, which is representative of any of test systems 106–109.

The controller 112 of test system 107 controls the interface 114 of test system 107, via bus 117, to interface with product 118, as represented by line 120, and obtain its product identifier (at block 200 of FIG. 2). For discussion purposes, the product identifier read from product 118 is "2TWP0".

To retrieve information about product 118 from the database 130, the controller 112 of test system 107 creates a request file and communicates it to the shared file directory 127 of the SRM 126 of the host computer 122 via communication link 124 (at block 202 of FIG. 2). The request file is created by the controller 112 of test system 107 to be an empty file, which is a file having no contents. The name of the request file is defined by the controller 112 of test system 107 to have the format <product_identifier><requested_data_type> and be a predetermined number of characters in length. The product_identifier field comprises the product identifier and, in the illustrated embodiment, is 5 characters in length. The requested_data_type field comprises a label indicating the type of data being requested. The label is provided by the controller 112 of test system 107 and, in the illustrated embodiment, is 2 characters in length. To request model number data, the controller 112 of test system 107 places the label ".M" in the requested_data_type field. Thus, to request the model number of product 118, the controller 112 of test system 107 creates a request file in the shared file directory 127 named "2TWP0.M" (<product_identifier> equals "2TWP0" and <requested_data_type> equals ".M").

Once the request file is created in the shared file directory 127, the controller 112 of test system 107 waits for a predetermined waiting period (at block 204 of FIG. 2). In the illustrated embodiment, the predetermined waiting period exercised by the controller 112 is approximately 1 sec.

After the predetermined waiting period elapses, the controller 112 (FIG. 1) of test system 107 polls the shared file directory 127 for a return file (at block 206 of FIG. 2). The controller 112 (FIG. 1) of test system 107 continues to poll until the return file is found or a predetermined polling period elapses (at block 207 of FIG. 2). The return file is created in the shared file directory 127 (FIG. 1) by the database server 128 in response to the request file and will be further discussed below in reference to FIG. 3. The controller 112 (FIG. 1) of test system 107 searches the shared file directory 127 for a file having a name that is of a predetermined length of characters and that contains the same product_identifier field as used in the name of the request file. In the illustrated embodiment, the name of the return file is 10 characters in length. In response to submitting the request file named "2TWP0.M", the controller 112 of test system 107 searches the shared file directory 127 for a return file having a name that is 10 characters in length and contains "2TWP0" in the first 5 characters. One such return file is named, for example, "2TWP01225D".

If the return file is found, the controller 112 of test system 107 reads the name of the return file from the shared file directory 127 via the communication link 124 (at block 208 of FIG. 2). The controller 112 (FIG. 1) of test system 107 extracts requested data from a requested_data field contained in the name of the return file (at block 210 of FIG. 2). The requested_data field comprises the data requested by the request file. In the illustrated embodiment, the requested_data field is 5 characters in length and, like the requested_data_type field of the request file, is appended to the end of the product_identifier field in the name of the file. With respect to the return file named "2TWP01225D", the controller 112 of test system 107 extracts "1225D" as the requested data or, more specifically, the requested model number of product 118. Once extracted, the controller 112 of test system 107 purges the return file from the shared file directory 127 (at block 212 of FIG. 2).

The controller 112 of test system 107 configures the test equipment 116 of test system 107 according to the requested data and then controls the test equipment 116 of test system 107 to test product 118 (at block 214 of FIG. 2) according to a test routine stored for the identified product. In the illustrated embodiment, the controller 112 of test system 107 has a plurality of test routines stored therein, one for each of the different models of the product 100 for which it is intended to be used. As such, the controller 112 of test system 107 configures the test equipment 116 of test system 107 specifically according to a testing configuration associated with model "1225D", for example. The test equipment 116 of test system 107 supplies the test results to the controller 112 of test system 107 via bus 117. Once testing is completed, the controller 112 of test system 107 controls the interface 114 of test system 107 via bus 117 and the conveyance 110 via bus 111 to release product 118 back to the conveyance 110 and communicates the test results in a data file to the host computer 122 for storage in the database 130 (at block 216 of FIG. 2). The robotic arm, for example, returns product 118 to the conveyance 110 for processing and testing further down the conveyance 110.

If the return file is not found within the predetermined polling period, which in the illustrated embodiment is approximately 8 secs., the controller 112 of test system 107 purges the request file from the shared file directory 127 (at block 218 of FIG. 2) and controls the interface 114 of test system 107 and the conveyance 110 to release product 118 back to the conveyance 110 (at block 216 of FIG. 2). When releasal occurs as a result of a lapse of the polling period, the controller 112 of test system 107 controls the conveyance 110 via bus 111 to off-line product 118 and prevent its delivery to test system 108. The robotic arm, for example, removes product 118 from the conveyance 110 to prevent processing and testing further down the conveyance 110.

The process shown in FIG. 3 is executed by the database server 128 of the host computer 122. The process is embodied as a messaging program, which is started by the database server 128 and runs continuously (at block 300 of FIG. 3). In the illustrated embodiment, the messaging program comprises a predetermined sequence of Unix, C, and SQL (Structured Query Language) commands contained in an accessible storage medium employed by the host computer 122. Such a storage medium includes RAM, a floppy or magnetic disk, a read/write CD ROM, or the like. In the illustrated embodiment, the messaging program is initiated via a Unix inittab file.

The database server 128 polls the shared file directory 127 of the SRM 126 until a request file is found therein (at block 302 of FIG. 3). The database server 128 (FIG. 1) searches the shared file directory 127 for a file having a name that is a predetermined number of characters in length, which in the illustrated embodiment is 7 characters. One such file is the request file, named "2TWP0.M" created by the controller 112 of test system 107 in the shared directory 127 at block 202 of FIG. 2.

Once a request file is found, the database server 128 (FIG. 1) reads the name of the request file from the shared file directory 127 via the connection 132 (at block 304 of FIG. 3). By only reading the name of the file, as opposed to accessing and opening the file to read its contents, processor loading and the response time is minimized. The database server 128 extracts the product identifier from the product_identifier field in the name of the request file and the label from the requested_data_type field in the name of the request file (at block 306 of FIG. 3). With respect to the request file named "2TWP0.M", the database server 128 extracts "2TWP0" as the product identifier and extracts ".M" as the label.

Once extracted, the database server 128 generates a query and queries the database 130 via connection 134 to retrieve requested data using the product identifier and the label as search fields (at block 308 of FIG. 3). In the illustrated embodiment, the database 130 includes a product_data table comprising columns and rows. The product_data table comprises a product—identifier column and a model_number column. Previously stored data of products 100 populate rows of the product_data table under respective columns. For example, product identifiers of products 100 populate the product_identifier column and model numbers of products 100 populate the model_number column. To retrieve the model number of product 118, the database server 128 executes a command, such as the following:

SELECT model_number INTO requested_data
   FROM product_data
   WHERE product_identifier="2TWP0";

The command retrieves the model number "1225D" from the model_number column corresponding to the row that contains "2TWP0" in the product_identifier column. Upon retrieval of the model number "1225D", the command defines a requested_data field to be "1225D".

Once the requested_data field is defined, the database server 128 creates a return file in the shared file directory 127 via connection 132 (at block 310 of FIG. 3). The return file is created by the database server 128 by renaming the request file. The name of the return file is defined by the database server 128 to have the format <product_identifier><requested_data> and be a predetermined number of characters in length. The product_identifier field of the return file name comprises the product_identifier field from the request file name. The requested_data field is defined via the aforementioned query of the database 130 and, in the illustrated embodiment, is 5 characters in length. To return the retrieved model number "1225D" of product 118, the controller 112 creates a return file in the shared file directory 127 named "2TWP01225D" (<product_identifier> equals "2TWP0" and <requested_data> equals "1225D"). By overwriting the request file rather than creating an additional file, processor loading on the host computer 122 and response time is minimized. Once the return file is created in the shared directory 127, the database server 128 returns to block 302 of FIG. 3.

The controller 112 of test system 107 is not limited to requesting only model number data from the database 130. The controller 112 of test system 107 could, for example, alternatively place the label ".T" in the requested_data_type field to request a test status of product 118 (i.e., whether the product 118 successfully completed testing at prior test systems), an ".R" in the requested_data_type field to request a repair status of product 118 (i.e., whether product 118 has any outstanding defects that need to be repaired), or a ".D" in the requested_data_type field to request the date when product 118 was assigned its model number. The database server 128, responsive to one of these alternative labels in the name of a request file, would accordingly alter the aforementioned query to retrieve data from other columns of the product_data table.

The controller 112 of test system 107 is also not limited to making a single data request per each request file. The controller 112 of test system 107 may place one or more labels in the requested_data_type field of the request file. For example, to request model number data and test status of product 118, the controller 112 of test system 107 would create the file named "2TWP0.M.T". In response to this file, the database server 128 would query multiple columns of the product_data table and may create a return file named "2TWP01225D106", wherein "106" would indicate to the controller 112 of test system 107 that product 118 successfully completed testing at test system 106. In most circumstances, the length of the name of a file is limited by operating systems employed by the controller 112 of the test systems 106–109 and the host computer 122. Version 6.2 of RMB employed by the controller 112 of the test systems 106–109 supports files having names consisting of up to 16 characters, and version 4.1.3 of AIX employed by the host computer 122 supports files having names consisting of up to 255 characters.

One skilled in the art will recognize that other test systems that require a shared resource manager to communicate with a Unix-based host computer; other Unix-based host computers, such as those commercially available from Hewlett Packard, Sun Microsystems, or the like; or other databases, such as those commercially available from Informix, DB2, or the like, could alternatively comprise the quality control system 104.

Thus it can be seen that substantially real-time bi-directional messaging between a test system and a database of a host computer can be accomplished by communicating files therebetween, wherein information is contained in the name of the files. When information is placed within a file and communicated by a test system, the recipient host computer must access, open, and read the contents of a file in order obtain the information. These operations are time consuming and cause heavy processor loading on the host computer. As a result, such communications can not be performed on a continuous basis. However, when information is placed in the name of a file and communicated by the test system, the recipient host computer can readily read the information from the name without having to access, open, and read the contents of the file. This minimizes processor loading and permits such communications to be carried on substantially continuously In a manufacturing environment, communicating information in file names, as described, allows a test system to retrieve data from a database at substantially real-time. This eliminates any need to maintain the same information in more than one location and, thereby, creates a more flexible and easily adaptable manufacturing environment, and minimizes the delay imposed on automated manufacturing systems by the test systems.

What is claimed is:

1. A quality control system comprising a test system, the test system comprising:
   an interface to obtain a product identifier from a product;
   a communication link ; and
   a controller coupled to the interface and the communication link, the controller, responsive to receiving the product identifier at the interface, to retrieve data about the product by creating a request file via the communication link, the request file being an empty file with a file name comprising a product identifier field and a requested data type field, the product identifier field corresponding to the product identifier received at the interface, and the requested data type field selected by the controller to correspond to a type of prestored data of the product.

2. The quality control system according to claim 1 wherein the controller reads a file name of a return file via the communication link, the return file being an empty file with a file name comprising the product identifier field and a requested data field, the requested data field containing the prestored data of the product associated with the requested data type field.

3. The quality control system according to claim 1 further comprising a host computer coupled to the communication link, the host computer comprising a database containing the prestored data of the product, the host computer, responsive to reading the file name of the request file, to query the database for the type of prestored data of the product using the file name of the request file and, thereafter, to rename the request file to create a return file, the return file being an empty file with a file name comprising the product identifier field and a requested data field, the requested data field containing the prestored data of the product associated with the requested data type field.

4. The quality control system according to claim 3 wherein
   the request file has a first predetermined length, and
   the return file has a second predetermined length, the second predetermined length greater than the first predetermined length.

5. The quality control system according to claim 3 wherein the host computer further comprises a shared file directory, the shared file directory accessible by the controller via the communication link, the shared file directory to hold the request file.

6. A quality control system according to claim 1 further comprising:
   a host computer, the host computer comprising:
      a database containing a plurality of data; and
      a database server coupled to the communication link and the database, the database server, responsive to reading the file name of the request file via the communication link, to query the database for the prestored data of the product using the file name of the request file and, thereafter, to create a return file readable via the communication link, the return file being an empty file having a file name comprising the product identifier field and a requested data field, the requested data field containing the prestored data of the product queried by the database.

7. The quality control system according to claim 6 wherein
   the request file has a first predetermined length, and
   the return file has a second predetermined length, the second predetermined length greater than the first predetermined length.

8. The quality control system according to claim 6 wherein the host computer further comprises a shared resource manager having a shared file directory, the shared file directory accessible by the database server and accessible by controller via the communication link, the shared file directory to hold the request file.

9. The quality control system according to claim 1 wherein the product identifier is a bar-code placed on the product.

10. The quality control system according to claim 1 wherein the product identifier is an electronic serial number stored within the product.

11. A method of messaging in a quality control system, the method comprising steps of:
   interfacing with a product to obtain a product identifier therefrom;
   creating, by a first computer, a request file in a directory, the request file being an empty file with a file name comprising a product identifier field and a requested data type field, the product identifier field corresponding to the product identifier, and the requested data type field corresponding to a type of prestored data of the product; and
   polling, by the first computer, the directory for a return file, the return file being an empty file with a file name comprising the product identifier field and prestored data of the product.

12. The method according to claim 11 further comprising the steps of:
   polling, by a second computer, the directory for the request file;
   reading, by the second computer, the file name of the request file when polling by the second computer is successful;
   extracting, by the second computer, the product identifier field and the requested data type field from the file name of the request file;
   querying, by the second computer, a database for prestored data of the product using the product identifier field and the requested data type field; and
   renaming, by the second computer, the request file to create the return file with a file name comprising a the product identifier field and a requested data field, the requested data field containing the prestored data of the product.

13. The method according to claim 11 further comprising the steps of:
   waiting, by the first computer, for a predetermined period of time prior to the step of polling;
   reading, by the first computer, the file name of the return file when polling is successful;
   extracting, by the first computer, prestored data of the product from the file name of the return file.

14. The method according to claim 13 further comprising the step of:
   purging, by the first computer, the return file from the directory following the step of extracting by the first computer.

15. The method according to claim 13 wherein the step of extracting by the first computer is followed by a step of testing the product according to the prestored data of the product.

16. The method according to claim 11 further comprising the step of purging, by the first computer, the request file from the directory when polling by the first computer is unsuccessful.

17. A quality control system employing bi-directional messaging, the quality control system comprising:
   a communication link;
   a host computer comprising a shared resource manager, a database server, and a database, the shared resource manager coupled to the communication link, the database server coupled to the shared resource manager and the database, the shared resource manager providing a shared file directory to hold files, the database containing a plurality of product data, the database server operable to query the database and to create and read files held in said shared file directory; and
   a test system comprising an interface, test equipment and a controller, the interface operable to interface with a product and retrieve a product identifier therefrom, the controller coupled to the interface and to the shared file directory via the communication link, the controller operable to create and read files in said shared file directory, and
   wherein
      the controller, upon retrieval of the product identifier, creates a request file in the shared file directory, the request file being an empty file with a file name comprising the product identifier and a prestored requested data type, and
      the database server, upon reading the file name of the request file, queries the database for product data according to the product identifier and the prestored requested data type, the database server, upon retrieval of the product data, creates a return file in the shared file directory by renaming the request file, the return file having a file name comprising the product identifier and the retrieved product data, the controller to read the file name of the return file to extract the product data therefrom, thereby, accomplish bi-directional messaging between the test system and the database.

* * * * *